United States Patent
Britt et al.

(10) Patent No.: US 9,652,717 B2
(45) Date of Patent: May 16, 2017

(54) AVOIDANCE OF SUPPORTING EVIDENCE PROCESSING BASED ON KEY ATTRIBUTE PREDICTORS

(71) Applicant: International Business Machines Corporation, Armonk, NY (US)

(72) Inventors: Michael W. Britt, Rochester, MN (US); Adam C. Lange-Pearson, Rochester, MN (US); Thomas P. Pitzen, Rochester, MN (US); Richard J. Stevens, Monkton, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 202 days.

(21) Appl. No.: 14/576,854

(22) Filed: Dec. 19, 2014

(65) Prior Publication Data

US 2016/0180233 A1    Jun. 23, 2016

(51) Int. Cl.
*G06F 17/30* (2006.01)
*G06N 5/04* (2006.01)

(52) U.S. Cl.
CPC ......... *G06N 5/048* (2013.01); *G06F 17/3053* (2013.01)

(58) Field of Classification Search
None
See application file for complete search history.

(56) References Cited

U.S. PATENT DOCUMENTS

| | | | | |
|---|---|---|---|---|
| 5,519,608 A * | 5/1996 | Kupiec | ............... | G06F 17/3064 704/9 |
| 9,317,586 B2 * | 4/2016 | Chu-Carroll | ...... | G06F 17/30654 |
| 2010/0293608 A1 * | 11/2010 | Schechter | ........... | G06F 17/2785 726/8 |
| 2012/0078636 A1 * | 3/2012 | Ferrucci | ............ | G06F 17/30654 704/270.1 |
| 2013/0013615 A1 * | 1/2013 | Brown | ..................... | A61B 5/00 707/741 |
| 2013/0066886 A1 * | 3/2013 | Bagchi | .............. | G06F 17/30654 707/749 |
| 2013/0132308 A1 * | 5/2013 | Boss | ................. | G06F 17/30976 706/12 |
| 2014/0006012 A1 * | 1/2014 | Zhou | ................. | G06F 17/30654 704/9 |
| 2014/0046889 A1 * | 2/2014 | Biem | .................... | G06F 19/345 706/46 |
| 2014/0272884 A1 | 9/2014 | Allen et al. | | |
| 2014/0272909 A1 | 9/2014 | Isensee et al. | | |
| 2014/0280087 A1 | 9/2014 | Isensee et al. | | |
| 2014/0297571 A1 | 10/2014 | Beamon et al. | | |
| 2014/0298199 A1 | 10/2014 | Johnson, Jr. et al. | | |
| 2015/0074095 A1 * | 3/2015 | Enders | .................... | G06F 17/27 707/725 |
| 2016/0180217 A1 * | 6/2016 | Boston | ..................... | G06N 5/02 706/46 |

* cited by examiner

*Primary Examiner* — Stanley K Hill
*Assistant Examiner* — David H Kim
(74) *Attorney, Agent, or Firm* — Patterson + Sheridan, LLP

(57) ABSTRACT

Systems, methods, and computer program products to perform an operation comprising receiving a case, generating a set of candidate answers for the case, excluding a first candidate answer from the set of candidate answers upon determining that a first attribute in the case precludes returning the first candidate answer as a valid response to the case, and processing supporting evidence for the remaining candidate answers in the set of candidate answers.

19 Claims, 4 Drawing Sheets

US 9,652,717 B2

AVOIDANCE OF SUPPORTING EVIDENCE PROCESSING BASED ON KEY ATTRIBUTE PREDICTORS

BACKGROUND

The present invention relates to deep question answering systems, and more specifically, to deep question answering systems which avoid supporting evidence processing based on key attribute predictors.

Currently, deep question answering systems (deep QA systems) incur a large percentage of processing overhead while searching and processing articles used as supporting evidence for candidate answers. Deep QA systems typically generate a large set of candidate answers and then search and process a large set of content to serve as supporting evidence for each candidate answer. The supporting evidence may include articles, research papers, or other any other content that supports the candidate answer as being a plausible response to the case. The overall performance of the deep QA system can be improved by optimizing the supporting evidence processing phase.

SUMMARY

Embodiments disclosed herein include systems, methods, and computer program products to perform an operation comprising receiving a case, generating a set of candidate answers for the case, excluding a first candidate answer from the set of candidate answers upon determining that a first attribute in the case precludes returning the first candidate answer as a valid response to the case, and processing supporting evidence for the remaining candidate answers in the set of candidate answers.

DETAILED DESCRIPTION

Embodiments disclosed herein provide deep question answering systems (deep QA systems) that avoid undertaking a supporting evidence workload based on key attribute predictors. "Supporting evidence processing," as referred to herein, includes the deep QA system searching for and retrieving items of supporting evidence from a corpus that include passages or other material that may support a candidate answer.

Generally, the deep QA systems disclosed herein are configured to identify, within a target domain of the case (or question) presented, one or more key attributes that are used as predictors of candidate answers of interest. If the deep QA system determines that a given candidate answer does not include these key attributes, the deep QA system will not perform supporting evidence processing for the candidate answer. Stated differently, in at least one embodiment disclosed herein, the deep QA system may avoid supporting evidence processing for candidate answers that are determined to not be appropriate responses to a case. For example, if a patient has a clear contraindication for a drug used in a particular therapy (e.g., the patient cannot be given the therapy due to an allergy), the deep QA system can skip processing supporting evidence for candidate answers that recommend or include this therapy, since doctor would not consider this therapy for the patient associated with the input case. Similarly, if a candidate answer scoring algorithm of the deep QA system indicates a treatment has been unsuccessful for patients having a similar case profile to the patient associated with the input case, the deep QA system may skip supporting evidence processing for the treatment, as the treatment is not likely to be helpful for this patient.

Figure 1:
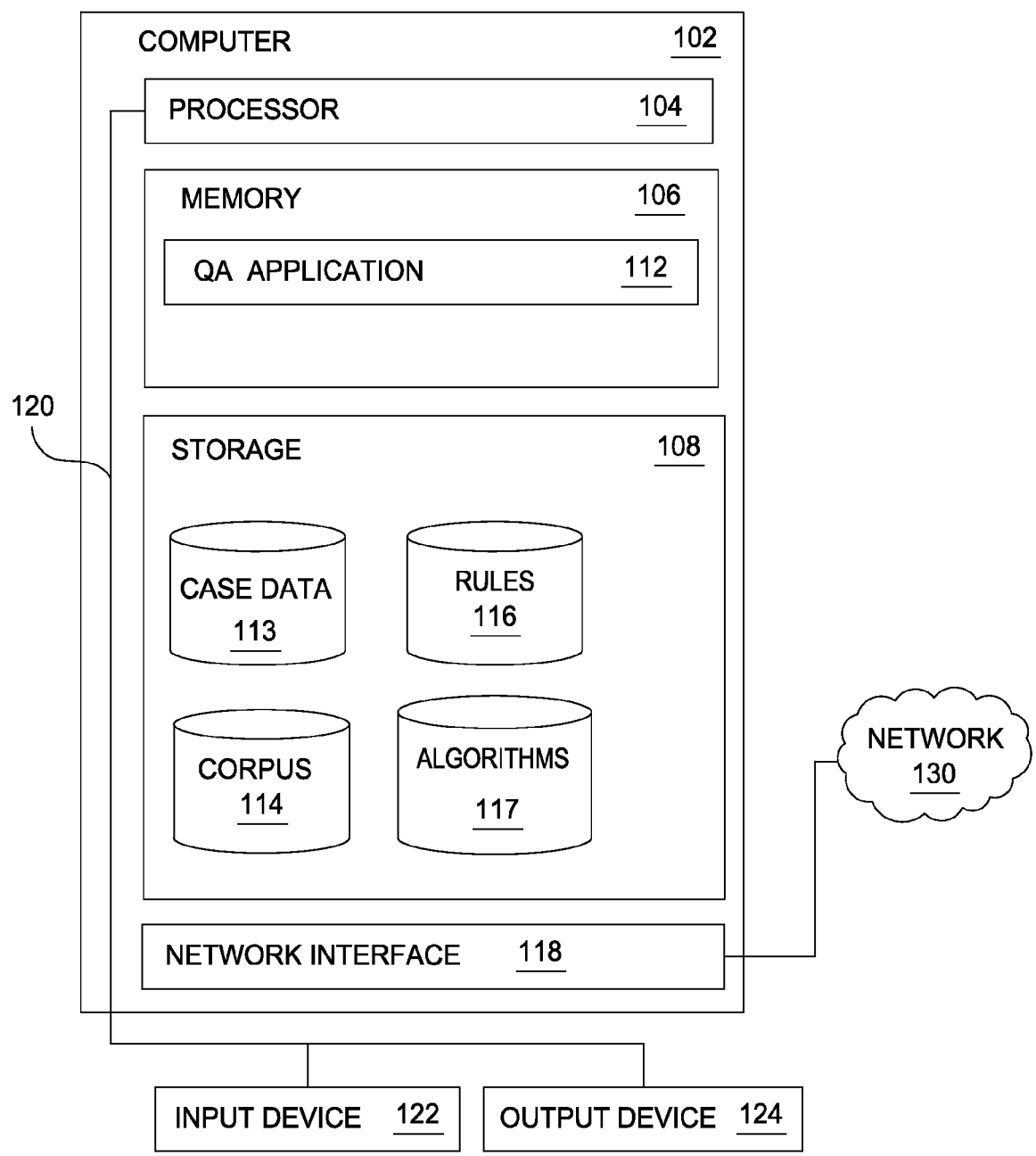
FIG. 1 illustrates a system which provides deep question answering systems that avoid supporting evidence processing based on key attribute predictors, according to one embodiment.

FIG. 1 illustrates a system 100 which provides deep question answering systems that avoid supporting evidence processing based on key attribute predictors, according to one embodiment. The networked system 100 includes a computer system 102. The computer system 102 may also be connected to other computers via a network 130. In general, the network 130 may be a telecommunications network and/or a wide area network (WAN). In a particular embodiment, the network 130 is the Internet.

The computer system 102 generally includes a processor 104 which obtains instructions and data via a bus 120 from a memory 106 and/or a storage 108. The computer 102 may also include one or more network interface devices 118, input devices 122, and output devices 124 connected to the bus 120. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is a programmable logic device that performs instruction, logic, and mathematical processing, and may be representative of one or more CPUs. The network interface device 118 may be any type of network communications device allowing the computer 102 to communicate with other computers via the network 130.

The storage 108 is representative of hard-disk drives, solid state drives, flash memory devices, optical media and the like. Generally, the storage 108 stores application programs and data for use by the computer system 102. In addition, the memory 106 and the storage 108 may be considered to include memory physically located elsewhere; for example, on another computer coupled to the computer system 102 via the bus 120.

The input device 122 may be any device for providing input to the computer 102. For example, a keyboard and/or a mouse may be used. The input device 122 represents a wide variety of input devices, including keyboards, mice, controllers, and so on. The output device 124 may include monitors, touch screen displays, and so on.

As shown, the memory 106 contains a QA application 112, which is an application generally configured to provide a deep question answering (QA) system. One example of a deep question answering system is Watson, by the IBM Corporation of Armonk, N.Y. A user may submit a case (also referred to as a question) to the QA application 112. The QA application 112 will then provide an answer to the case based on an analysis of a corpus of information 114. Although depicted as executing on a single computer, the QA application 112 may run on a grid or cluster of computers (not pictured).

The QA application 112 is trained to generate responses to cases during a training phase. During the training phase, the QA application 112 is trained to answer cases using an "answer key" which predefines the most correct responses. During training, the QA application 112 ingests content in the corpus 114 to produce one or more machine learning models (not pictured). In addition, during the training phase, the QA application 112 is configured to identify data attributes which are important to answering cases (namely, those attributes having an impact on the confidence score of a given answer).

After being trained, the QA application 112 may process user cases through a runtime analysis pipeline. In at least one embodiment, the case data 213 include medical records of a patient, and the candidate answers returned by the QA application 112 correspond to a set of recommended treatments, ranked by a confidence score of each respective candidate answer. The analysis pipeline executes a collection of analysis programs to evaluate both the question text and candidate answers to construct the most probable correct answer, based on the information extracted from the corpus and from the question. A typical execution pipeline may begin with question analysis, which analyzes and annotates each question presented in the case to identify key topics, concepts, and attributes for conducting a search. The next step of the pipeline may include a primary search, which involves searching for documents in the corpus 114 using the key attributes from the question analysis phase. The next step of the pipeline may generate candidate answers. For example, the QA application 112 may identify key matching passages (based on, for example, topics, concepts, and/or string matching) from the search results with passages in the candidate answers. In the next step of the pipeline, the QA application 112 may then retrieve and process supporting evidence for the candidate answers. The QA application 112 may then complete the pipeline by scoring the various candidate answers, from which the most correct answer identified by the QA application 112 may returned to the user along with any retrieved and processed items of supporting evidence.

The QA application 112 is further configured to skip supporting evidence processing for certain candidate answers. "Supporting evidence processing," as referred to herein, includes the QA application 112 searching for and retrieving items of supporting evidence from the corpus 114 that include passages or other material that may support a candidate answer. Generally, the QA application 112 may avoid supporting evidence processing for candidate answers that are determined to not be appropriate responses to a case. For example, the QA application 112 may identify drug X as a candidate answer for a patient's treatment. However, the patient's information in the case data 113 may indicate that the patient has a severe allergy to drug X. Based on the patient's allergy attribute, the QA application 112 may skip supporting evidence processing for drug X, allowing the QA application 112 to conserve resources that would otherwise be wasted processing supporting evidence for drug X. Furthermore, foregoing supporting evidence processing may allow the QA application 112 to return responses to cases more quickly.

The QA application 112 may determine to forego supporting evidence processing for candidate answers based on any criteria or attribute indicating the candidate answer is likely to be an invalid or uninteresting response to the case. In at least one embodiment, the QA application 112 may skip processing a candidate answer based on rules 116. For example, assume one of the rules 116 indicates that a treatment is contraindicated where a patient has a blood pressure that exceeds a specified threshold. If the patient's information in the case data 113 indicates the patient's blood pressure exceeds the threshold, then QA application 112 may determine that the rule is satisfied. Because of the contraindication, the QA application 112 may determine to skip supporting evidence processing any candidate answers which recommend or include this treatment. In one embodiment, the QA application 112 may confirm that a confidence score for the candidate answer is below a confidence threshold before determining to forego supporting evidence processing for the candidate answer.

In another embodiment, the QA application 112 may forego candidate answer processing where one of the candidate answer scoring algorithms 117 indicates that a candidate answer is not an appropriate response for the case. For example, a first scoring algorithm in the algorithms 117 may be a "contraindication algorithm," which returns an output indicating whether a treatment (or candidate answer) is contraindicated for the current patient. If the contraindication algorithm indicates that the treatment is contraindicated for the patient, the QA application 112 may skip supporting evidence processing for candidate answers which recommend or otherwise include for the treatment. As another example, one of the algorithms 117 may indicate whether the candidate treatment was effective for other patients having a similar profile to the current patient. If such an algorithm indicates the candidate treatment was unsuccessful for other patients, the QA application 112 may forego processing supporting evidence for candidate answers recommending this treatment.

When presenting a response to the case, the QA application 112 may include a set of supporting evidence for each candidate answer provided to the user. If the QA application 112 did not process supporting evidence for a given candidate answer, the QA application 112 may provide an indication to the user that supporting evidence was not processed for that candidate answer. In one embodiment, the QA application 112 provides an explanation why supporting evidence was not processed. For example, the QA application 112 may inform the user that supporting evidence for a candidate answer recommending treatment Y was not processed because the QA application 112 determined that treatment Y would be contraindicated for the patient (e.g., based on attributes in the case data submitted to the QA application 112).

As shown, the storage 108 includes a case data 113, a corpus 114, a rules 116, and an algorithms 117. The case data 113 includes data related to the case submitted by a user. For example, in a medical setting, the case data 113 may include a patient's medical history, and any other data regarding the patient. The corpus 114 is a body of information used by the QA application 112 to generate answers to questions (also referred to as cases). For example, the corpus 114 may contain scholarly articles, dictionary definitions, encyclopedia references, product descriptions, web pages, and the like. The rules 116 provide rules applied to the case data 113 to determine whether to skip supporting evidence processing for a candidate answer. For example, one of the rules 116 may identify contraindication for a drug treatment based on attributes of a patient (such as age, weight, and the like). In one embodiment, the QA application 112 may search the corpus 114 to identify rules and store the identified rules in the rules 116. Algorithms 117 represent algorithms used by the QA application 112 to score candidate answers. At least some of the scoring algorithms in the algorithms 117 may produce an output indicating a candidate answer is a valid response for the case. For example, a contraindication algorithm in the algorithms 117 may be configured to scan a patient's record in the case data 113 and check for any known contraindications for a candidate treatment. If the contraindication algorithm produces an output indicating that the candidate treatment is contraindicated for the patient, the QA application 112 may forego processing supporting evidence for candidate answers which include the candidate treatment, as the candidate treatment cannot be given to the patient.

Figure 2:
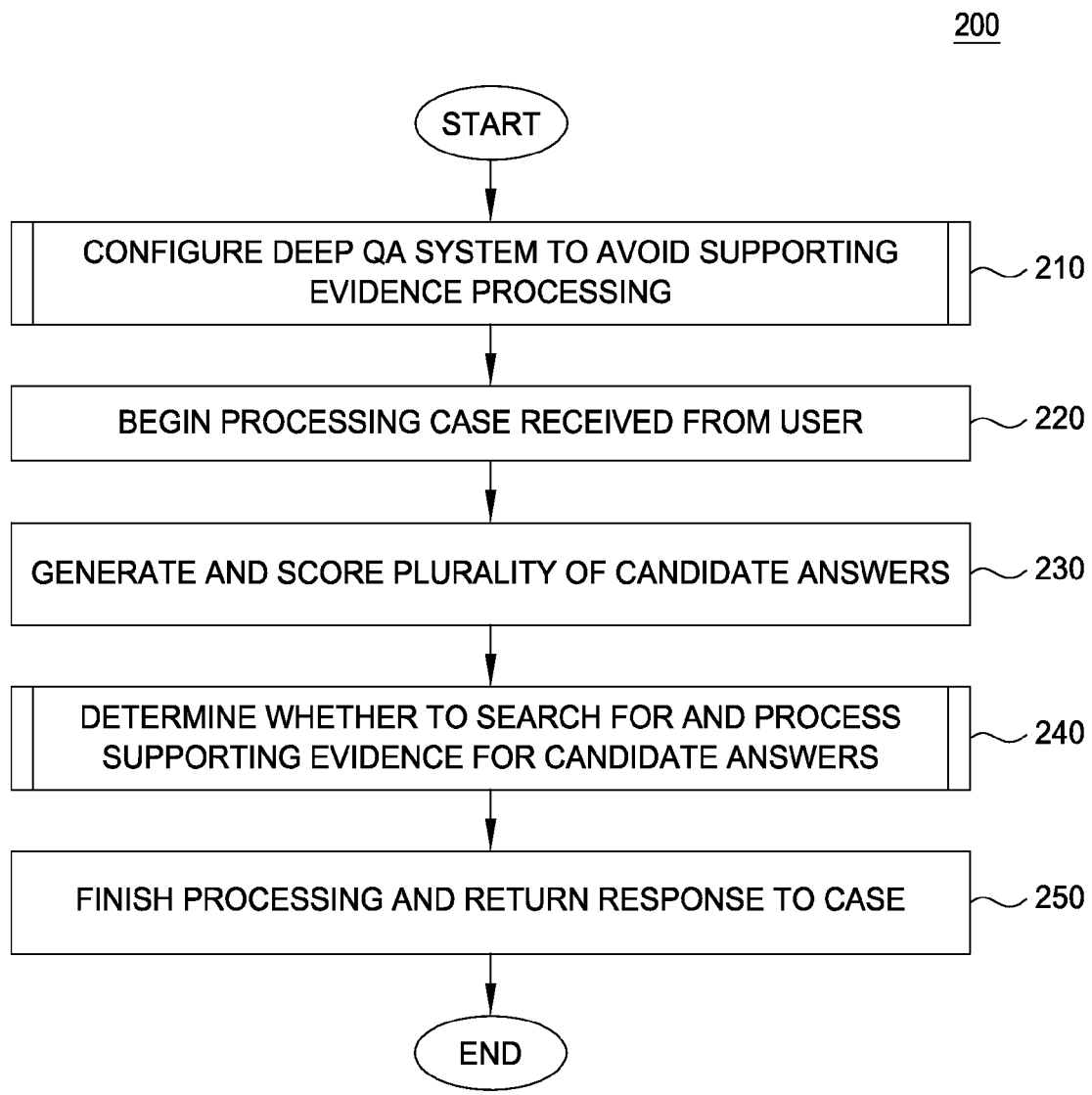
FIG. 2 illustrates a method to provide deep question answering systems that avoid supporting evidence processing based on key attribute predictors, according to one embodiment.

FIG. 2 illustrates a method 200 to provide deep question answering systems that avoid supporting evidence processing based on key attribute predictors, according to one embodiment. The method 200 begins at step 210, described in greater detail with reference to FIG. 3, where the QA application 112 is configured to avoid supporting evidence processing. Generally, at step 210, the QA application 112 is configured to determine rules used to identify candidate answers which are not valid responses to cases. The rules, in turn, allow the QA application 112 to skip processing supporting evidence for candidate answers that satisfy the rule (or violate the rule, depending on how the rule is defined). At step 220, the QA application 112 may begin processing a case (or question) received from a user. At step 230, the QA application 112 may generate and score a plurality of candidate answers as part of the processing pipeline. At step 240, described in greater detail with reference to FIG. 4, the QA application 112 may determine whether to search for and process supporting evidence for candidate answers. At step 250, the QA application 112 may finish processing the case and return a response to the case. Generally, the response may include one or more candidate answers ranked based on the final confidence score for each candidate answer. In addition, the response may include supporting evidence for a subset of the candidate answers. The response may include an indication of which candidate answers were not subjected to supporting evidence processing and a description or summary of why supporting evidence was not processed.

Figure 3:
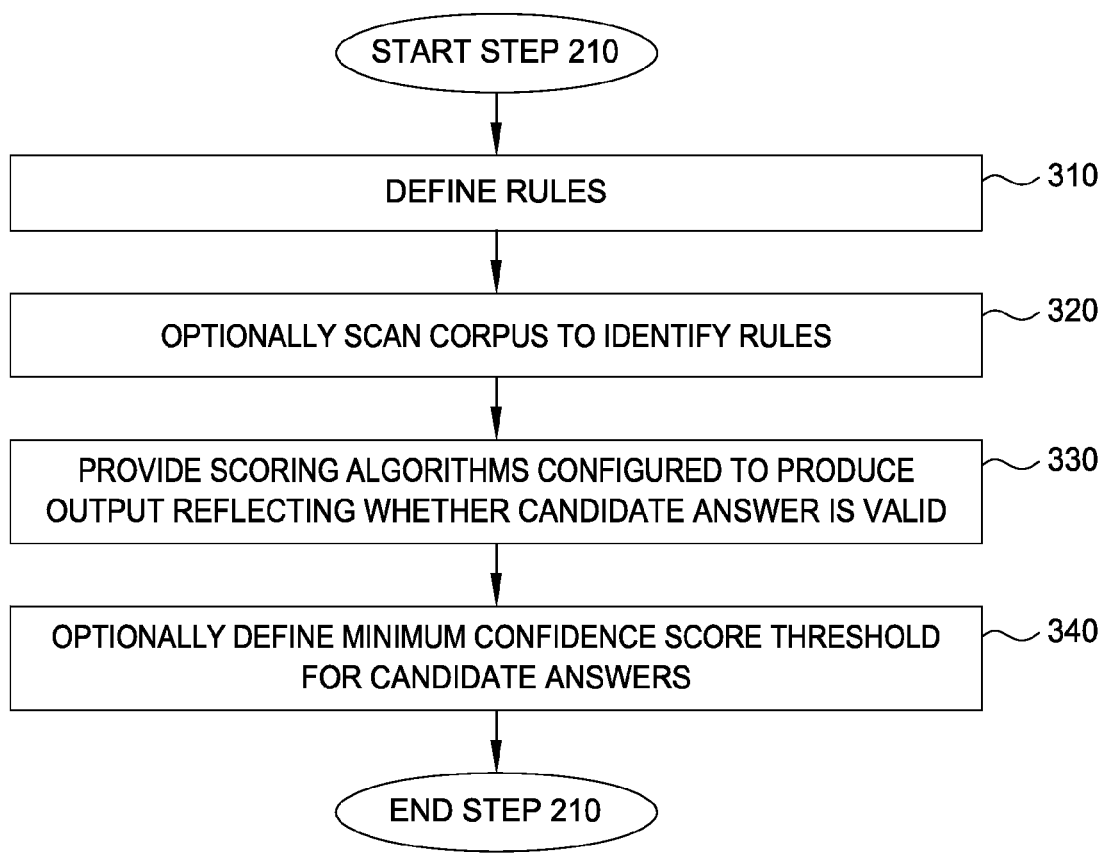
FIG. 3 illustrates a method to configure a deep question answering system to avoid supporting evidence processing, according to one embodiment.

FIG. 3 illustrates a method 300 corresponding to step 210, according to one embodiment. That is, FIG. 3 illustrates a method 300 to configure a deep question answering system to skip supporting evidence processing for certain candidate answers, according to one embodiment. The method 300 begins at step 310, where a user may define rules in the rules 116. The rules may specify one or more key attributes that are predictors of candidate answers of interest. Similarly, the rules may specify attribute criteria that, if not met, indicate that a candidate answer is not a valid response to a case. For example, a first rule in the rules 116 may indicate that a chemotherapy drug is contraindicated when a patient's prostate specific antigen (PSA) levels are above a specified threshold. Doing so may allow the QA application 112 to determine that the patient's PSA is a key attribute, and that if the patient's case data 113 indicates that the patient's PSA exceeds the specified threshold, the patient cannot receive the chemotherapy drug. Therefore, if the patient's PSA exceeds the threshold, the QA application 112 may not process supporting evidence for the chemotherapy drug, as the patient cannot be prescribed the chemotherapy drug. At step 320, the QA application 112 may optionally scan the corpus 114 to identify rules. For example, the QA application 112 may identify a drug label of the chemotherapy drug which states "contraindicated if PSA is greater than 10 ng/mL." In such a case, the QA application 112 may store a rule in the rules 116 reflecting the contraindication.

At step 330, the QA application 112 selects which scoring algorithms 117 should be used to identify candidate answers to exclude from supporting evidence processing (for example, where the output of the algorithm indicates a candidate answer is a not valid response to a case). For example, as previously indicated, a contraindication algorithm may return an output indicating whether or not a treatment is contraindicated for a patient. If the output of the contraindication algorithm indicates the treatment is contraindicated for the patient, the QA application 112 may forego supporting evidence processing for the treatment, as the patient cannot be given the treatment. At step 340, a minimum confidence score threshold for candidate answers may optionally be defined. If a confidence score for a candidate answer is below the minimum threshold, the QA application 112 may forego supporting evidence processing for the candidate answer. In at least one embodiment, the QA application 112 may store the threshold in the rules 116.

Figure 4:
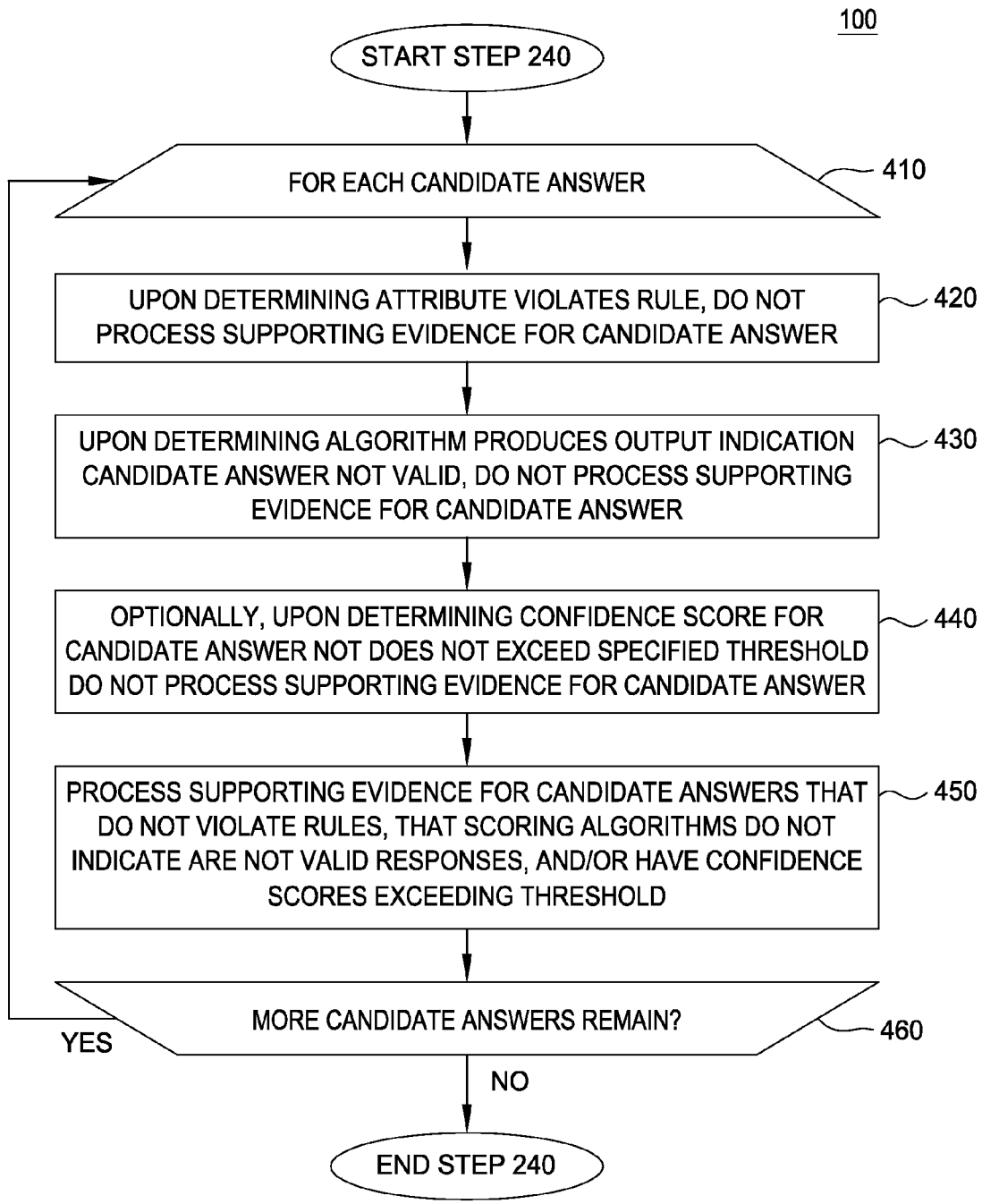
FIG. 4 illustrates a method to determine whether to search for and process supporting evidence for a plurality of candidate answers generated by a deep question answering system, according to one embodiment.

FIG. 4 illustrates a method 400 for determining whether to process supporting evidence for candidate answers generated by a deep question answering system, according to one embodiment. The method 400 begins at step 410, where the QA application 112 executes a loop including steps 420-450 for each candidate answer the QA application 112 generates as a candidate response to a case. At step 420, the QA application 112 not process supporting evidence for a candidate answer upon determining that an attribute of the case violates a rule specified in the rules 116. For example, a rule in the rules 116 may specify that children under the age of 12 cannot receive a drug as treatment for an illness. If the patient is less than 12 years old, the patient cannot receive the drug, and the QA application 112 will not process supporting evidence for the drug.

At step 430, the QA application 112 may not process supporting evidence for the candidate answer upon determining that the output of an algorithm in the algorithms 117 indicates that the candidate answer is not a valid response to the case. For example, if the contraindication algorithm produces an output indicating the current candidate treatment (or answer) is contraindicated for the patient, then the QA application 112 may forego supporting evidence processing for the treatment, as the patient cannot be given the treatment. At step 440, the QA application 112 may optionally not process supporting evidence for candidate answers having confidence scores that do not exceed the minimum confidence threshold. At step 450, the QA application 112 may process supporting evidence for candidate answers that were not excluded by one of the rules 116, algorithms 117, or which have a confidence score exceeding the minimum confidence threshold. At step 460, the QA application 112 determines whether more candidate answers remain. If so, the QA application 112 returns to step 410 to determine whether to process supporting evidence for the next candidate answer. If no candidate answers remain, the method 400 ends.

Advantageously, embodiments disclosed herein provide deep question answering systems which are configured to bypass supporting evidence processing for different types of candidate answers. If a candidate answer is determined not to be a valid response to a case, the deep question answering system may forego processing the supporting evidence for that candidate answer, conserving system resources, and returning responses to users faster than would be returned by performing unnecessary supporting evidence processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the QA application 112 could execute on a computing system in the cloud and not process supporting evidence for a subset of candidate answers. In such a case, the QA application 112 could identify rules or attributes for answering the question, and store the rules and/or the attributes at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
receiving a case;
generating a set of candidate answers for the case based on a corpus of information;
excluding a first candidate answer from the set of candidate answers upon determining that a first attribute in the case precludes returning the first candidate answer as a valid response to the case based on a first rule, of a plurality of rules for processing supporting evidence;
processing supporting evidence for the remaining candidate answers in the set of candidate answers by searching for items of evidence in the corpus of information that include passages supporting at least one candidate answer for each candidate answer in the set of candidate answers; and
foregoing processing supporting evidence for the first candidate answer by refraining from searching for items of evidence in the corpus of information that include passages supporting the first candidate answer.

2. The method of claim 1, wherein the set of candidate answers specifies candidate answers for which supporting evidence will be processed, wherein supporting evidence is not processed for the first candidate answer, wherein the first rule comprises a minimum confidence threshold for a confidence score of each of the candidate answers, wherein the attribute of the first candidate answer comprises the confidence score for the first candidate answer, wherein the first candidate answer is excluded from the set of candidate answers upon determining that the confidence score for the first candidate answer is below the minimum confidence threshold, wherein foregoing processing supporting evidence for the first candidate answer is based upon the determination that the confidence score for the first candidate answer is below the minimum confidence threshold.

3. The method of claim 2, wherein an output of a candidate answer scoring algorithm specifies that the first attribute and the first rule precludes returning the first candidate answer as a valid response to the case, wherein the first candidate answer is further excluded from the set of candidate answers based on the output of the candidate answer scoring algorithm.

4. The method of claim 3, further comprising:
outputting, to a user presenting the case, an indication that supporting evidence for the first candidate answer is not included as part of a response to the case at least in part due to the first attribute.

5. The method of claim 4, further comprising:
excluding a second candidate answer from the set of candidate answers upon determining that at least one of the first attribute and a second attribute preclude returning the second candidate answer as a valid response to the case.

6. The method of claim 1, further comprising:
storing an indication that the first attribute is relevant to returning a valid response to a class of cases including the received case.

7. A system, comprising:
one or more computer processors; and a memory containing a program, which when executed by the one or more computer processors, performs an operation comprising:

receiving a case;

generating a set of candidate answers for the case based on a corpus of information;

excluding a first candidate answer from the set of candidate answers upon determining that a first attribute in the case precludes returning the first candidate answer as a valid response to the case based on a first rule, of a plurality of rules for processing supporting evidence;

processing supporting evidence for the remaining candidate answers in the set of candidate answers by searching for items of evidence in the corpus of information that include passages supporting at least one candidate answer for each candidate answer in the set of candidate answers; and foregoing processing supporting evidence for the first candidate answer by refraining from searching for items of evidence in the corpus of information that include passages supporting the first candidate answer.

8. The system of claim 7, wherein the set of candidate answers specifies candidate answers for which supporting evidence will be processed, wherein supporting evidence is not processed for the first candidate answer, wherein the first rule comprises a minimum confidence threshold for a confidence score of each of the candidate answers, wherein the attribute of the first candidate answer comprises the confidence score for the first candidate answer, wherein the first candidate answer is excluded from the set of candidate answers upon determining that the confidence score for the first candidate answer is below the minimum confidence threshold, wherein foregoing processing supporting evidence for the first candidate answer is based upon the determination that the confidence score for the first candidate answer is below the minimum confidence threshold.

9. The system of claim 8, wherein an output of a candidate answer scoring algorithm specifies that the first attribute and the first rule precludes returning the first candidate answer as a valid response to the case, wherein the first candidate answer is further excluded from the set of candidate answers based on the output of the candidate answer scoring algorithm.

10. The system of claim 9, the operation further comprising:

outputting, to a user presenting the case, an indication that supporting evidence for the first candidate answer is not included as part of a response to the case at least in part due to the first attribute.

11. The system of claim 10, the operation further comprising:

excluding a second candidate answer from the set of candidate answers upon determining that at least one of the first attribute and a second attribute preclude returning the second candidate answer as a valid response to the case.

12. The system of claim 7, the operation further comprising:

storing an indication that the first attribute is relevant to returning a valid response to a class of cases including the received case.

13. A computer program product, comprising:

a computer-readable storage medium having computer-readable program code embodied therewith, the computer-readable program code executable by one or more computer processors to perform an operation comprising:

receiving a case;

generating a set of candidate answers for the case based on a corpus of information;

excluding a first candidate answer from the set of candidate answers upon determining that a first attribute in the case precludes returning the first candidate answer as a valid response to the case based on a first rule, of a plurality of rules for processing supporting evidence;

processing supporting evidence for the remaining candidate answers in the set of candidate answers by searching for items of evidence in the corpus of information that include passages supporting at least one candidate answer for each candidate answer in the set of candidate answers; and foregoing processing supporting evidence for the first candidate answer by refraining from searching for items of evidence in the corpus of information that include passages supporting the first candidate answer.

14. The computer program product of claim 13, wherein the set of candidate answers specifies candidate answers for which supporting evidence will be processed, wherein supporting evidence is not processed for the first candidate answer, wherein the first rule comprises a minimum confidence threshold for a confidence score of each of the candidate answers, wherein the attribute of the first candidate answer comprises the confidence score for the first candidate answer, wherein the first candidate answer is excluded from the set of candidate answers upon determining that the confidence score for the first candidate answer is below the minimum confidence threshold, wherein foregoing processing supporting evidence for the first candidate answer is based upon the determination that the confidence score for the first candidate answer is below the minimum confidence threshold.

15. The computer program product of claim 14, wherein an output of a candidate answer scoring algorithm specifies that the first attribute and the first rule precludes returning the first candidate answer as a valid response to the case, wherein the first candidate answer is further excluded from the set of candidate answers based on the output of the candidate answer scoring algorithm.

16. The computer program product of claim 15, wherein the operation further comprises:

outputting, to a user presenting the case, an indication that supporting evidence for the first candidate answer is not included as part of a response to the case at least in part due to the first attribute.

17. The computer program product of claim 16, wherein the operation further comprises:

excluding a second candidate answer from the set of candidate answers upon determining that at least one of the first attribute and a second attribute preclude returning the second candidate answer as a valid response to the case.

18. The computer program product of claim 17, the operation further comprising:

determining, during a training phase of a question answering system, that the first attribute impacts the confidence score of the first candidate answer beyond an impact threshold.

19. The computer program product of claim 18, wherein the plurality of rules are defined by: (i) a user, and (ii) the question answering system based on the corpus of information.

\* \* \* \* \*